US007860757B2

(12) United States Patent
Cotton et al.

(10) Patent No.: US 7,860,757 B2
(45) Date of Patent: Dec. 28, 2010

(54) ENHANCED TRANSACTION FULFILLMENT

(75) Inventors: Mark F. Cotton, Danville, CA (US); Stacy W. Liddicoat, Alamo, CA (US)

(73) Assignee: Accenture Global Services Limited, Dublin (IE)

(*) Notice: Subject to any disclaimer, the term of this patent is extended or adjusted under 35 U.S.C. 154(b) by 297 days.

(21) Appl. No.: 12/145,818

(22) Filed: Jun. 25, 2008

(65) Prior Publication Data

US 2008/0262865 A1  Oct. 23, 2008

Related U.S. Application Data

(63) Continuation of application No. 10/808,730, filed on Mar. 25, 2004, now abandoned.

(60) Provisional application No. 60/541,701, filed on Feb. 3, 2004.

(51) Int. Cl.
*G06Q 30/00* (2006.01)
(52) U.S. Cl. ...................................................... 705/26
(58) Field of Classification Search .................. 705/26, 705/27
See application file for complete search history.

(56) References Cited

U.S. PATENT DOCUMENTS

| | | | |
|---|---|---|---|
| 5,424,944 A | 6/1995 | Kelly et al. | |
| 5,664,111 A | 9/1997 | Nahan et al. | |
| 5,845,265 A | 12/1998 | Woolston | |
| 5,946,662 A | 8/1999 | Ettl et al. | |
| 5,960,411 A | 9/1999 | Hartman et al. | |
| 6,029,141 A * | 2/2000 | Bezos et al. | 705/27 |
| 6,035,288 A | 3/2000 | Solomon | |
| 6,041,308 A * | 3/2000 | Walker et al. | 705/14 |
| 6,058,417 A | 5/2000 | Hess et al. | |
| 6,064,980 A | 5/2000 | Jacobi et al. | |
| 6,085,169 A | 7/2000 | Walker et al. | |
| 6,085,176 A | 7/2000 | Woolston | |
| 6,202,051 B1 | 3/2001 | Woolston | |
| 6,266,649 B1 | 7/2001 | Linden et al. | |
| 6,317,722 B1 | 11/2001 | Jacobi et al. | |
| 6,343,273 B1 | 1/2002 | Nahan et al. | |
| 6,356,878 B1 | 3/2002 | Walker et al. | |
| 6,415,320 B1 | 7/2002 | Hess et al. | |
| 6,466,917 B1 | 10/2002 | Goyal et al. | |
| 6,466,918 B1 | 10/2002 | Spiegel et al. | |

(Continued)

OTHER PUBLICATIONS

"eBay", http://www.accenture.com/xd/xd.asp?it=enWeb&xd=industries/communications/alliances.

(Continued)

*Primary Examiner*—Mila Airapetian
(74) *Attorney, Agent, or Firm*—Fish & Richardson P.C.

(57) ABSTRACT

A unified online marketplace storefront may be used to sell items from multiple vendors. Managing a multi-vendor online sales channel may involve receiving, from each of a number of sellers, information describing one or more items for sale. The items for sale may be presented to potential buyers through a unified storefront on an online marketplace. The unified storefront can mask identities of the sellers and present a consistent interface to the potential buyers. The managing of the online sales channel also may involve receiving an order from a buyer to purchase an item through the unified storefront, and taking flash title to the sold item prior to fulfilling the buyer's order.

17 Claims, 5 Drawing Sheets

U.S. PATENT DOCUMENTS

| | | | |
|---|---|---|---|
| 6,484,153 | B1 | 11/2002 | Walker et al. |
| 6,523,037 | B1 | 2/2003 | Monahan et al. |
| 6,553,346 | B1 | 4/2003 | Walker et al. |
| 6,604,107 | B1 | 8/2003 | Wang |
| 7,249,059 | B2 | 7/2007 | Dean et al. |
| 7,359,871 | B1 | 4/2008 | Paasche et al. |
| 7,440,908 | B2 | 10/2008 | Snapp et al. |
| 2001/0037245 | A1 | 11/2001 | Ranganath et al. |
| 2002/0013758 | A1* | 1/2002 | Khaitan ................... 705/37 |
| 2002/0023004 | A1 | 2/2002 | Hollander et al. |
| 2002/0032597 | A1 | 3/2002 | Chanos |
| 2002/0099678 | A1 | 7/2002 | Albright et al. |
| 2002/0116302 | A1 | 8/2002 | Wilmes et al. |
| 2002/0156685 | A1 | 10/2002 | Ehrlich et al. |
| 2002/0169640 | A1 | 11/2002 | Freeland |
| 2002/0169658 | A1 | 11/2002 | Adler |
| 2002/0169676 | A1 | 11/2002 | Floyd |
| 2003/0014350 | A1 | 1/2003 | Duell et al. |
| 2003/0033205 | A1 | 2/2003 | Nowers et al. |
| 2003/0154134 | A1 | 8/2003 | Wang |
| 2003/0204289 | A1* | 10/2003 | Banerjee et al. ............. 700/241 |
| 2004/0015415 | A1 | 1/2004 | Cofino et al. |
| 2004/0064396 | A1* | 4/2004 | Say ............................ 705/37 |
| 2005/0033648 | A1 | 2/2005 | Jin et al. |
| 2005/0055281 | A1 | 3/2005 | Williams |
| 2005/0171858 | A1 | 8/2005 | Cotton et al. |
| 2005/0197909 | A1 | 9/2005 | Klenske |
| 2005/0197946 | A1 | 9/2005 | Williams et al. |
| 2005/0203804 | A1 | 9/2005 | Suzuki |
| 2006/0190352 | A1 | 8/2006 | Zeidman |

OTHER PUBLICATIONS

"Improving Inventory Turn and Value Online: What is your eBay Strategy?" A Connection to eBay White Paper, Apr. 2003.

Andale, "Sales Analyzer", http://www.andale.com/rep/rep_quickstart.jsp?foo=4379&resetStoresNav=y May 28, 2004.

Andale, "Smart Tools and Services to Help you Sell on eBay", http://www.andale.com/corp/products/products.jsp May 28, 2004.

Jabil Circuit, "Jabil Global Services", http://www.jabil.com/1048.asp May 28, 2004.

Jabil Circuit, "Returns", http://www.jabil.com/1037.asp, May 28, 2004.

Troy Wolverton, "Accenture connects to eBay", Cnet News.com, Oct. 23, 2002; http://news.com/2102-1017-963086.html.

Troy Wolverton, "eBay-Accenture deal aimed at big guns", Cnet News.com, May 7, 2002; http://news.com/2100-1017-901190.html?tag=n1.

Accenture: "eBay, Accenture to link consumers to manufacturer' and retailers' inventories," Electronic Commerce New, May 13, 2002, v7i10pg1, Proquest #119400039, 3pgs.

Amazon: "Amazon.com Auctions Helps Online Sellers Become Effective Mailceters," PR Newswire, Aug. 18, 1999, Proquest #44014963, 4pgs.

Andale "Andale 2003 Einstein Product Showcase", downloaded from the internet at http://presstours.andale.com/search.html on Jul. 1, 2003, 10 pages.

Anderson, USPTO Office Action in U.S. Appl. No. 10/794,769 dated Nov. 30, 2007, 24 Pages, to be published by USPTO with the file history of this application.

Anderson, USPTO Office Action in U.S. Appl. No. 10/794,769 dated Jun. 25, 2008, 26 Pages, to be published by USPTO with the file history of this application.

Buterin, "Top Dog Sales Strategy", Purple Squirrel, Oct. 2001, downloaded from the internet at http://www.purplesquirrel.com/articles/2001/oct/buterin.shtml on Dec. 31, 2003, 3 pages.

Connection to eBay; "eBay and Accenture unveil new service . . . ," Business Wire, May 7, 2002; Proquest #1181166491, 3 pgs.

Dunham, USPTO Office Action in U.S. Appl. No. 10/797,906 dated Jan. 8, 2007, 12 Pages, to be published by USPTO with the file history of this application.

Dunham, USPTO Office Action in U.S. Appl. No. 10/797,906 dated Jun. 20, 2007, 11 Pages, to be published by USPTO with the file history of this application.

Dunham, USPTO Office Action in U.S. Appl. No. 10/797,906 dated Sep. 22, 2008, 14 Pages, to be published by USPTO with the file history of this application.

Dunham, USPTO Office Action in U.S. Appl. No. 10/797,906 dated Mar. 26, 2009, 11 Pages, to be published by USPTO with the file history of this application.

Dunham, USPTO Office Action in U.S. Appl. No. 10/797,906 dated Jul. 23, 2009, 10 Pages, to be published by USPTO with the file history of this application.

Haider, USPTO Office Action in U.S. Appl. No. 10/794,583 dated Jul. 3, 2008, 6 Pages, to be published by USPTO with the file history of this application.

Haider, USPTO Office Action in U.S. Appl. No. 10/794,583 dated Dec. 10, 2008, 26 Pages, to be published by USPTO with the file history of this application.

Haider, USPTO Office Action in U.S. Appl. No. 10/794,583 dated Jun. 22, 2009, 8 Pages, to be published by USPTO with the file history of this application.

Haq, USPTO Office Action in U.S. Appl. No. 10/808,730 dated Jan. 9, 2007, 7 Pages, to be published by USPTO with the file history of this application.

Haq, USPTO Office Action in U.S. Appl. No. 10/808,730 dated May 1, 2007, 8 Pages, to be published by USPTO with the file history of this application.

Haq, USPTO Office Action in U.S. Appl. No. 10/808,730 dated Oct. 16, 2007, 19 Pages, to be published by USPTO with the file history of this application.

Haq, USPTO Office Action in U.S. Appl. No. 10/808,730 dated Jul. 17, 2008, 10 Pages, to be published by USPTO with the file history of this application.

Keefe, Collin; "Where haves meet wants," Dealerscope, Jan. 2002; v44i1 ,p. 50; Proquest #988243388, 9 pgs.

"Operating Agreement", Amazon.com, http://affiliate-program.amazon.com/gp/associates/agreement/ref=amb_link_517882_10/103-5314425-4118200?pf_rd_m=ATVP.

Participation Agreement, http://amazon.com/gp/help/customer/display.html/002-5582521-1516869?ie=UTF8&nodeId=1161302&qid=1184600773&sr=2-1, (1 of 7), Jul. 16, 2007, 12:50:26 PM.

Pond, USPTO Office Action in U.S. Appl. No. 10/658,671 dated May 2, 2008, 16 Pages, to be published by USPTO with the file history of this application.

Pond, USPTO Office Action in U.S. Appl. No. 10/658,671 dated Dec. 12, 2008, 14 Pages, to be published by USPTO with the file history of this application.

Pond, USPTO Office Action in U.S. Appl. No. 10/658,671 dated May 13, 2009, 10 Pages, to be published by USPTO with the file history of this application.

Priceline.com Incorporated Web Site Terms & Conditions, Agreement between User and priceline.com Incorporated, http://www.priceline.com/customerservice/faq/ShowHelp.asp?faq=ext(AIRPOP_ TERMS), (1 of 20), Jul. 16, 2007, 12:49:36 PM.

* cited by examiner

ENHANCED TRANSACTION FULFILLMENT

CROSS REFERENCE TO RELATED APPLICATIONS

This application is a continuation of U.S. patent application Ser. No. 10/808,730, filed Mar. 25, 2004 now abandoned, which claims the benefit of priority from U.S. Provisional Application entitled "Multi-Vendor Online Marketplace", filed Feb. 3, 2004, Application Ser. No. 60/541,701, the disclosures of which are incorporated by reference.

BACKGROUND

The following description relates to providing access to online marketplace services, for example, to allow sellers of property or merchandise to sell goods or items through an online auction. An online marketplace is one that may be accessed via one or more web sites through which people and organizations from around the world can buy and sell goods and services. Among other goods and services, items such as collectibles, books, jewelry, appliances, computers, tickets, sporting goods, furniture, equipment, vehicles, and vacation packages may be listed, bought and/or sold on online marketplace web sites.

Participants in online marketplaces may include individuals, small companies, large corporations, or other types of organizations. In general, the term "organization" may refer to a company, enterprise, business, government, educational institution, or the like. The term "organization" can also refer to a group of persons, such as an association or society.

Some participants in online marketplaces may have business-to-business (B2B) relationships with other participants that may tend to focus on a vertical market, such as healthcare or automotive. Participants in a B2B auction can liquidate unwanted capital assets, dispose of excess inventory, and buy or sell equipment, goods, and services. Other participants in an online marketplace may have a business-to-customer (B2C) relationship, in which a business may sell goods and services to the consumer market In one example of an online marketplace, EBAY Inc. of San Jose, Calif. provides online services in which buyers and sellers can list, browse, buy and/or sell various goods and services in a web-based marketplace. Among other services, EBAY facilitates online auctions in which EBAY typically does not directly handle or own the goods. Instead, EBAY can facilitate the listing of the goods and services, like want-ads in a newspaper, and facilitate transactions of buying and selling activities between buyers and sellers. Among other operations, EBAY can provide listing features beyond what can be offered in a newspaper, such as a dynamic pricing structure.

Instead of, or in addition to, online auctions, an online marketplace may provide a fixed-priced format for selling goods and services. For example, the online marketplaces of EBAY, AMAZON.COM, Inc. of Seattle Wash. and BUY.COM, Inc. of Aliso Viejo, Calif. provide fixed-priced selling, in which the seller offers goods at a fixed, predetermined price. The price of the good may be a factor of the Manufacturer's Suggested Retail Price (MSRP), and/or the price of the same good from other sellers.

An online marketplace represents a sales channel—that is, an avenue for selling goods or services—that has become popular only recently. More traditional sales channels include "brick-and-mortar" storefronts, for example, a department store in which a good (e.g., a shirt) can be sold to buyers of the good. Other sales channels include catalog sales, door-to-door sales, and telemarketing sales. A seller may use multiple sales channels to sell its goods or services—e.g., retail stores and an online sale channel such as a web site with similar product offerings. In the case of an online sales channel, a seller may either set-up and maintain its own dedicated web-site that sells only its own merchandise or the seller may use an online marketplace web-site (e.g. EBAY, AMAZON.COM or BUY.COM) that sells merchandise owned by several different sellers. As used herein, "online sales channel" encompasses both dedicated, single-seller online sales channels as well as multiple-seller online sales channels.

SUMMARY

In one implementation, a unified online marketplace storefront may be used to sell items from multiple (i.e., two or more) vendors. Managing a multi-vendor online sales channel may involve receiving, from each of a number of sellers, information describing one or more items for sale; presenting the items for sale to potential buyers through a unified storefront on an online marketplace; receiving an order from a buyer to purchase an item through the unified storefront; and taking flash title to the sold item prior to fulfilling the buyer's order (e.g., at the point of sale). The unified storefront masks the identities of the sellers and presents a consistent interface to the potential buyers In another implementation, managing a multi-vendor online sales channel may involve arranging a sale of items on an online sales channel from a number of sellers, in which the online sales channel includes an e-commerce storefront to sell the items for the sellers. An identity of the seller is anonymous to a buyer. The arrangement of the sale includes: providing a set of one or more conditions of service for the sellers; receiving information related to the sale of the one or more items from a seller; listing the received information on the online sales channel; and assuming a legal title to the one or more items at a point of sale.

In another implementation, a multi-vendor online sales channel may include a unified e-commerce storefront operated by a first entity and that presents items for sale from a number of independent merchants. The unified storefront represents the first entity and masks the merchants' respective identities from potential buyers. The online sales channel includes a transaction processor to vest flash title in the first entity at a point of sale of an item and to determine sales tax liability based, in part, on a residence of the first entity.

The unified e-commerce storefront may be a single, web-based e-commerce storefront that appears from the consumers' perspective to be affiliated with a single seller (e.g., the unified storefront operator) but, in fact, serves multiple merchants. For purposes of sales tax determination and collection, and/or for compliance with any other laws or regulations, the unified storefront owner takes flash title at the point of sale, and thus becomes the seller of record from the buyer's perspective. As a result, the residence or situs of the unified storefront operator is the relevant location not only for legal and regulatory purposes, but also for logistical reasons such as shipping costs, insurance and the like.

The systems and techniques described here may provide one or more of the following advantages. A connection provider can provide liquidation services for merchants selling small or sporadic quantities of inventory. The unified storefront can be utilized, for example, in cases of corporate asset recovery. Among other potential benefits realized, individual merchants can sell under a consistent, unified storefront, and the unified storefront will have a lower probability of running out of inventory of a particular item than an individual seller. The individual merchant can sell small or sporadic quantities of inventory without having to use its resources to build a sales channel. Another benefit may be provided to merchants who do not do business in the kind or type of goods they are selling on the unified storefront (e.g., a real estate firm selling used office equipment).

Another potential advantage is that merchants can sell items anonymously on the unified storefront. Merchants can also send SKUs (Stock-Keeping Units) to the connection provider 203, and the connection provider can keep track of all of the SKUs for each merchant. By maintaining the SKUs for merchants for items for sale, the connection provider (1) can have an accounting of the items for sale, and (2) report to the merchants about the sales performance of the items for sale. The connection provider may assume title to the items at the point of sale to handle tax and sales transactions for various merchants across various jurisdictions—thus, relieving the merchants of using the merchant's resources to solve tax and legal jurisdictional issues. The connection provider, when functioning as a unified storefront, may also reduce the setup and operational costs of the merchants, leverage the existing customer feedback for improved sales results, and reduce an amount of time it takes for items to list online.

In general, the unified storefront is operated under a single set of terms and conditions. As a result, interactions with the storefront will be uniform and predictable both from the multiple merchants' and the potential buyers' respective viewpoints.

The details of one or more implementations are set forth in the accompanying drawings and the description below. Other features and advantages will be apparent from the description and drawings, and from the claims.

DRAWING DESCRIPTIONS

Like reference symbols in the various drawings may indicate like elements.

DETAILED DESCRIPTION

Figure 1:
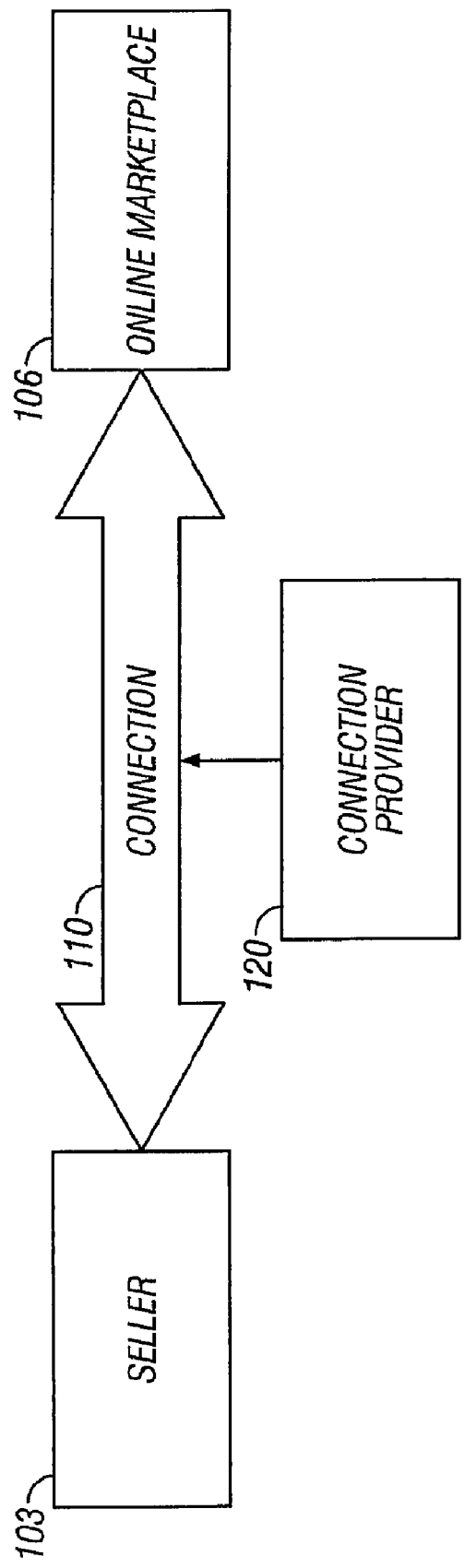
FIG. 1 is an exemplary block diagram of a connection between a seller and an online sales channel.

The following description relates to selling one or more items on an online sales channel, for example, selling goods of multiple owners through a single anonymous channel such as a unified e-commerce storefront. FIG. 1 is a block diagram of a connection 110 between a seller 103 and an online marketplace 106. The seller 103 may offer items to sell through the online marketplace sales channel 106. As used herein, "items" can mean goods—whether new, used or refurbished—services, or a combination of goods and services. In one implementation, the seller 103 can employ a connection provider 120 who will facilitate the connection 110 to one or more online marketplaces 106. The online marketplaces 106 may provide a primary or alternative sales channel for the seller 103. The one or more online marketplaces 106 may or may not be owned and/or controlled by the connection provider 120. Typically, the connection provider 120 is a separate legal entity from the online marketplaces 106 to which it provides a connection 110.

Examples of connection providers include ACCENTURE Ltd., CHANNELADVISOR Corp. and AUCTIONWORKS, Inc. Examples of sellers include retails stores, department stores, electronic stores, music stores, online clothing stores, travel agencies, equipment vendors, etc. In addition, enterprises not ordinarily in the business of selling goods, a services provider, for example, may nevertheless find it beneficial to establish an online sales channel to sell items such as used computer equipment, office furniture, excess supplies and the like. Examples of online sales channels include EBAY, AMAZON, and BUY.COM.

A seller 103 need not necessarily employ a connection provider 120 to develop an alternative sales channel on the online marketplace 106, but rather may develop the alternative sales channel using its own personnel and resources, for example, by accessing the online sales channel directly and listing its items for sale. Typically, directly listing items for sale on an online sales channel requires an investment of the seller's resources including personnel time, capital, and labor. For example, an automobile parts supplier may hire its own staff and purchase extra computers to list, for example, new or refurbished automobile parts on EBAY.

Alternatively, the seller 103 may employ a third-party connection provider 120 to develop an alternative sales channel on the online marketplace 106. In that case, the seller 103 need not, for example, hire extra staff, buy additional equipment, or develop the in-house expertise for the alternative sales channel. Rather, the seller 103 can hire the connection provider 120 to outsource the development and maintenance of the alternative sales channel. In hiring the connection provider 120, the seller 103 may form a relationship or an account with the connection provider 120.

Using the systems and techniques described here, the connection provider 120 may provide listing and selling services for one or more merchants, each of which desires to sell a quantity of items. The merchant may also have sporadic quantities of inventory to sell on the online sales channel. In a case where the merchant wants to sell refurbished electronics, for example, the merchant may have a quantity that varies seasonally. For example, the merchant may sell 2-3 items online at a time during most of the calendar year, but may have a larger quantity of items to sell (e.g., 20-30) after a holiday shopping season due to returns from purchasers.

The connection provider 120 can serve as a unified storefront to serve as an online sales channel for multiple merchants and to offer items from multiple (potentially disparate) merchants in a single, uniform storefront that provides buyers with a familiar sales channel environment. The unified storefront can be utilized in cases of corporate asset recovery. For example, suppose one or more organizations want to sell some used computers (e.g., laptop computers) or office equipment (e.g., printers, fax machines, copiers). The items from the merchants can be grouped together in categories (e.g., laptops, printers, copiers, etc.), and sold on the unified storefront. One potential advantage of this selling method is that individual merchants can sell under the representation of the unified storefront, and the unified storefront is likely have a lower probability of running out of inventory of a particular item than if relying on just a single merchant for that item. Moreover, the individual merchant can sell small or sporadic quantities of inventory without having to use its resources to build and maintain a dedicated sales channel. In particular, a benefit may also be provided to merchants who do not do business in the kind or type of goods they are selling on the unified storefront (e.g., a real estate firm selling used office equipment).

Another potential advantage is that merchants can sell items anonymously on the unified storefront. A merchant may want to sell items anonymously for a number of reasons. For example, the merchant might have purchased a set of items from a competitor (e.g., for reverse-engineering or testing purposes), and may not want to let potential sellers know that they have purchased those items. In another example, a merchant may be having financial difficulty and may want to consolidate offices and sell some office equipment. As another example, a merchant may avoid publicly selling items that would tend to diminish the merchant's good will, or otherwise dilute or confuse the merchant's existing brands. In the anonymous sales channel environment facilitated by the unified storefront, the listing and buying of the items on the unified storefront can be transparent to the buyer—that is, the buyers can purchase goods from the unified storefront without knowing the identity of the underlying merchant or even that multiple merchants are involved.

In one implementation, the connection provider 120 develops and controls one or more fulfillment centers that are tailored to the specific items that are sold over the online sales channel. The connection provider 120 can provide customized listing and fulfillment services to one or more sellers 103. The items that are sold may have properties or characteristics that depend on the nature of the items. For example, certain items may require one or more services to be performed on them before they are in suitable condition for sale. For example, certain items may need to be refurbished, cleaned, altered, modified, inventoried, or otherwise processed before they are in appropriate condition for sale. Alternatively, or in addition, items for sale may have certain characteristics that require special handling or a particular environment in a fulfillment center before, during or after they are sold to a buyer. For example, a characteristic of a perishable food item may require that the food item be kept at a certain temperature during shipping or storage. In another example, a flower or plant may require certain lighting and watering conditions. The connection provider can provide the seller with a tailored fulfillment center that can accommodate one or more properties or characteristics of the items being sold.

The connection provider may also provide a fulfillment center that can fulfill the orders for multiple different merchants. The connection provider can offer efficiencies and economies of scale in operating tailored fulfillment centers that can service multiple sellers with similar items. By providing fulfillment centers to a seller, the seller may have the flexibility of using its resources in areas other than in fulfillment of its purchased items. As a result, the seller can sell its items efficiently and without the overhead that otherwise may be needed for online sales channel development, maintenance, and marketing. These advantages may further result in benefits such as a faster time-to-market for the seller and higher profit margins for the items sold. Moreover, by focusing resources and efforts on specialized areas for certain items, fulfillment centers may operate more efficiently and may have a higher level of expertise regarding the items they service.

The seller can supply information about the items being sold to the connection provider—for example, in the form of an electronic document such as a Product Data File—and the connection provider can use this information to arrange for the items to be sold on an online marketplace. The connection provider can supply different levels of service to the seller. In one level of service, the merchant can fulfill the order through one or more tailored fulfillment centers. At another service level, the connection provider may also allow the seller to fulfill orders through the seller's own fulfillment centers.

Figure 2:
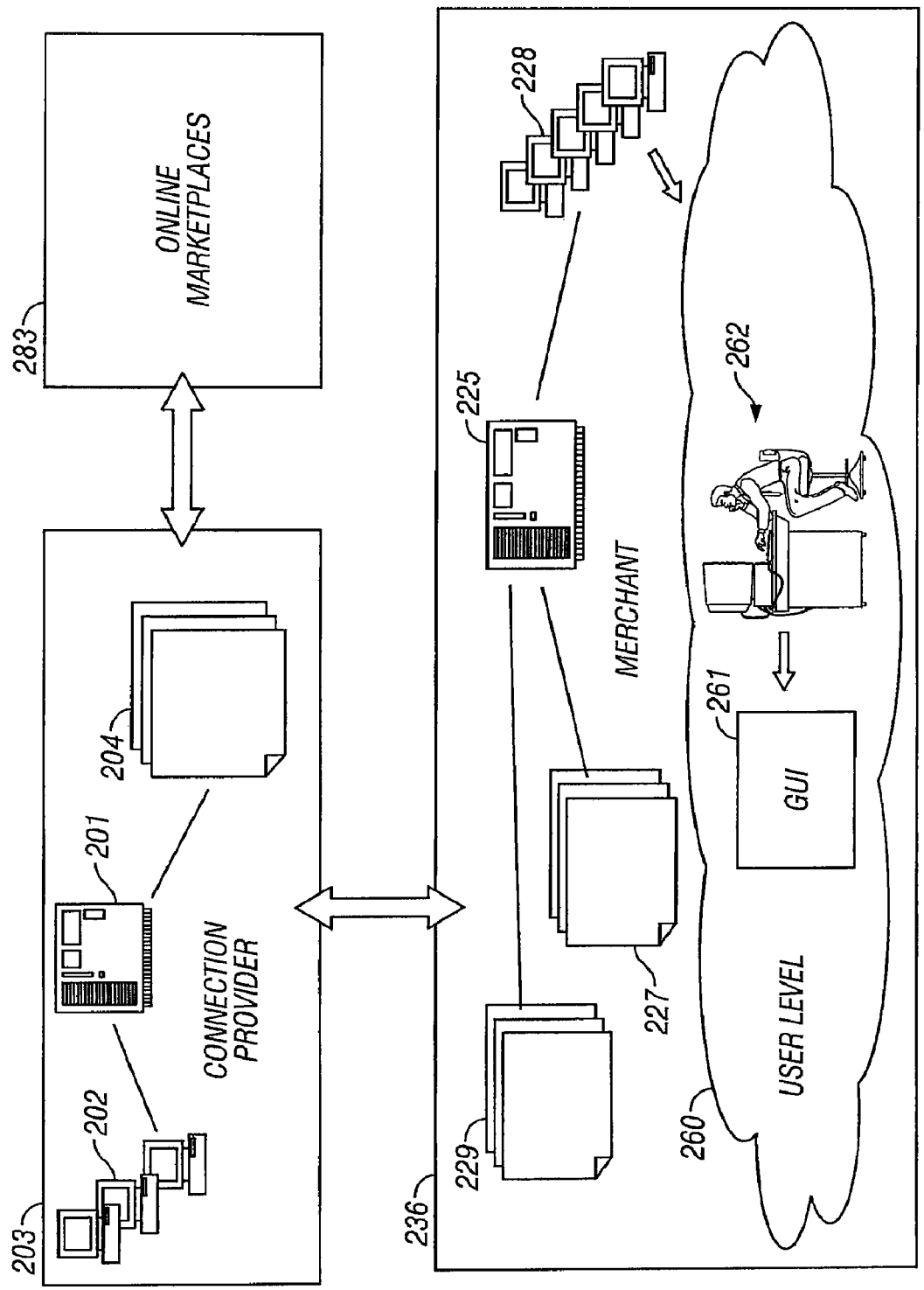
FIG. 2 is an exemplary block diagram of a computer system architecture.

FIG. 2 shows an exemplary architectural block diagram of a connection system. The seller or merchant 236 may employ one or more computer system users 262 to enter information for one or more items for sale in a graphical user interface 261. The merchant's computer system may have a repository or database 225 with files, objects, and documents 227, 229 with information describing the merchant's items, businesses, financial information, human resource information, etc. Typically, the information describing the merchant's items for sale is recorded and maintained at the level of a SKU (Stock-Keeping Unit)—a unique identifier, usually alphanumeric, of a particular product that allows it to be tracked for inventory purposes. The merchant's information may be accessed in a network of computers 228. The merchant's system may also be on a physically distributed system, in which information may reside on one or more computers 228 and databases 225, and may be accessed by one or more users 262. The merchant 236 may transmit SKU information—typically in the form of a PDF—to a connection provider 203, which then uses the information to list the items for sale on one or more online marketplaces 283. The information transmitted to and received from the connection provider 203 may include one or more of the following: business-specific information, such as sales and customer information; data within objects, spreadsheets, and text files; and business-related applications and logic. The information generated from the merchant 236 may be generated by a program or an automated process that may not require a user 262 or a corresponding graphical user interface 261.

Alternatively, or in addition, a third party service provider (either related to the connection provider or not, depending on implementation) may provide the product information. For example, if a merchant desires to use a connection provider to sell used laptops, the connection provider may specify that the merchant's used laptop inventory be sent to a refurbisher who will then process the inventory by cleaning, auditing and wiping the laptops' hard drives. The audit process generates a report detailing the machine specs and its condition. This report is then provided to the connection provider and used to list the inventory for sale on an online marketplace. In such an implementation, the merchant does not have to provide any product information upfront, whether in the form of a PDF or otherwise.

At a basic level, the connection provider 203 offers connection services between one or more merchants 236 and one or more online marketplaces 283. The connection provider may have a computer system architecture that includes objects, documents 204 and information residing on one or more repositories or databases 201. The information may be networked among multiple computers 202. The connection provider 203 may or may not share hardware resources with the online marketplaces 283.

The connection provider may also receive information from multiple sellers (not shown) regarding the items they are selling. The connection provider can facilitate a sale of the items through one or more online sales channels. The items may sell at different times and in different quantities and may sell to different customers on several online sales channels. The connection provider can then facilitate the fulfillment of sold items through one or more fulfillment centers controlled by a connection provider, in which at least one fulfillment center can be operated according to one or more parameters that are tailored to a common requirement or characteristic of the sold items.

When merchants send SKUs to the connection provider 203, the connection provider can keep track of all of the SKUs for each merchant. By maintaining the SKUs for merchants for items for sale, the connection provider (1) can have an accounting of the items for sale, and (2) can report to the merchants about the sales performance of the items for sale. In one case, the connection provider receives a SKU (e.g., 0123456789) from a merchant for an item, and the connection provider can append a specific merchant number (e.g., 0012) to the SKU number (e.g., 0123456789) to create a new SKU number (e.g., 0123456789-0012). The specific merchant number may be a number that is defined internally to the connection provider, and may be used, along with the new SKU number, for internal accounting purposes.

Figure 3:
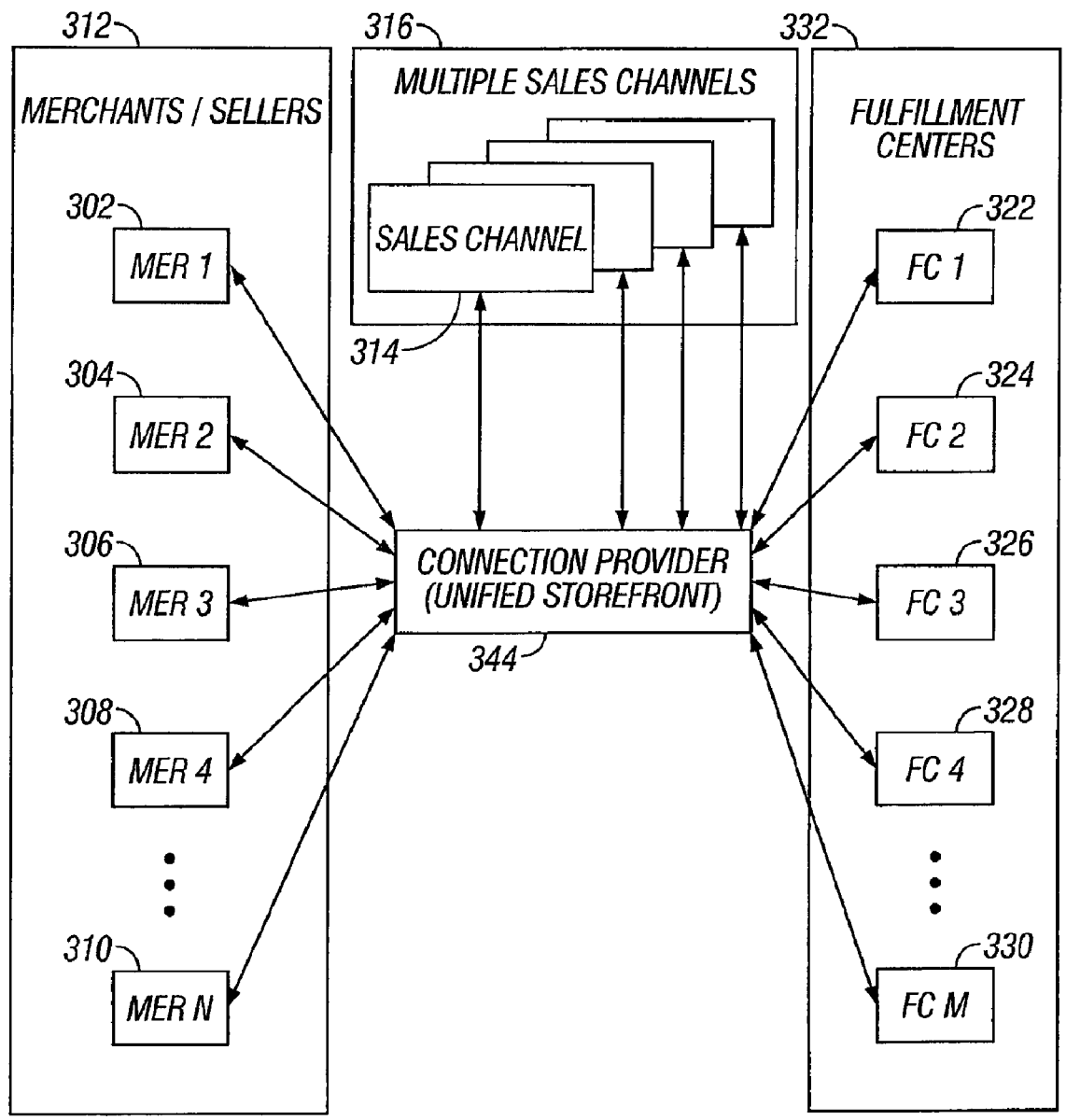
FIG. 3 is an exemplary block diagram of an online sales channel connection architecture.

FIG. 3 is a block diagram of a connection architecture in which a connection provider 344 facilitates one or more merchants/sellers 312 access and/or connection to one or more online sales channels 316. As described in FIG. 2, the connection provider 344 may receive information from a seller 312, in which the information describes one or more items for sale by the seller. The connection provider 344 may facilitate a sale of the item through one or more online sales channels 314. The connection provider 344 may also facilitate fulfillment of the item for sale with a fulfillment center 332. In a typical implementation, the connection provider 344 provides software infrastructure (e.g., data communications and user interface capabilities) that enable a merchant/seller 312 to provide information describing one or more items to be sold on an online sale channel. The connection provider 344 then lists the items for sale on one or more online sales channels 316 and, depending on the level of service selected by the seller/merchant 312, can fulfill an order (that is, a consummated sale) of an item using a fulfillment center 332 that is appropriate to the nature of the item sold.

The fulfillment centers 312 may have one or more parameters tailored to characteristics, features and/or processing requirements of the sold item. For example, FC1 may correspond to a "new-in-box" fulfillment center that handles fulfillment of sales of items that are sold as new in boxes as received from the item's manufacturer (e.g., TV sets or laptop computers). FC2 may, for example, correspond to a "refurbishment" fulfillment center that receives used, and potentially damaged, items from a seller and then refurbishes them as needed to place them in condition for sale. Such refurbishment may include activities such as cleaning, reformatting, replacing consumable components, re-labeling, certifying and/or virtually anything else needed to place the items in the desired condition for sale. Computer equipment that has been used internally by a seller's employees, and which is being upgraded or replaced, is an example of the types of items that may be fulfilled through a refurbishment fulfillment center.

Further, FC3 may correspond to a "fragmented inventory" fulfillment center. In this type of fulfillment center, a seller typically has a collection of various odds and ends that it wants to sell through an online sales channel. In many case, these odds and ends may not be part of regular inventory and be in various states of disorganization or disrepair. For example, following a large sale or after taking inventory, a department store may discover that it has many items that are close-outs, last of kind, odd sizes, mis-marked on unlabeled, and so on. Because in many cases such odds and ends are not adequately recorded in the seller's inventory database, the seller may be unable to prepare or send a Product Data File that describes these items at a SKU level.

To dispose of these odds and ends the department store can load up the items and send them directly to a fragmented inventory fulfillment center, which will then process the items, for example, by organizing, labeling, pricing, inventorying, assigning SKUs, re-conditioning, grouping, photographing (e.g., for display on the online sales channel website) and so on. An end result of such processing by a fragmented inventory fulfillment center typically would include the creation of an electronic data file, such as a Product Data File describing each of the fragmented inventory items at a SKU level, which could then be transmitted to the connector provider's computer systems by the fulfillment center. Note that such an implementation of a fragmented inventory fulfillment center provides an additional level of service to the seller—namely, the creation and maintenance of the Product Data File for the items to be sold by the connection provider.

Among the other functions described here, the fulfillment center 332 also may serve as a warehouse, shipping, storage, or distribution center for the items sold. The connection provider 344 may, at least at some level, control the fulfillment centers 332, and at least one of the fulfillment centers 332 may be operated according to one or more parameters tailored to the sold items. Because a fulfillment center may provide one or more services, and/or have one or more parameters relating to fulfilling orders for items sold for multiple sellers, there may be at least one fulfillment center to fulfill sales of items owned by multiple, different sellers but which has at least some features, characteristics and/or processing requirements in common. Hence, multiple sellers may share a common fulfillment center due to a commonality related to a particular fulfillment center's parameters. Similarly, sales of a single merchant's items may be fulfilled through multiple different fulfillment centers, each fulfillment center selected depending on features, characteristics, or processing requirements of the various items being sold by the seller through the online sales channel.

As used herein, a fulfillment center controlled by the connection provider encompasses both fulfillment centers that are owned and/or operated by the connection provider as well as fulfillment centers that are outsourced to a third party, but which are operated, at least in part, according to one or more parameters defined by the connection provider.

The connection provider 344 may be an intermediary that facilitates access to one or more online sales channels 316 and which neither takes title and/or possession of the items being sold. Alternatively, in an implementation of the unified storefront, the connection provider does assume title to the items but not until they are sold. That is, at the point of sale (e.g., the time checkout is completed and payment is made), the connection provider 344 may assume "flash title" to the item for sale. Flash title refers to a legal title that the connection provider assumes for an item from the point of sale to the time the order is fulfilled (e.g., when the item is delivered to the buyer). One case where the connection provider may assume flash title of the item can be in a jurisdiction where the connection provider has to legally own the item (even if temporarily) to be able to sell the item.

Another potential reason why the unified storefront operator (whether the connection provider or another entity) may desire to take flash title to goods as they are sold is for the purposes of simplifying and/or enhancing the predictability of computing and collecting sales tax on the items purchased. For example, if the unified storefront operator did not take title to the goods sold, then the identity of the state to which sales tax was owed would vary not only with the residence of the buyer, but also with the residence of the particular merchant whose merchandise was purchased. As a result, the unified storefront operator would have to keep track of multiple merchants' states of residences and perform a relatively complicated analysis when attempting to determine which state, if any, is owed sales tax for a particular purchase. This analysis would further be complicated for orders that included goods of multiple merchants residing in different states. From the perspective of the buyer (unknowing of multiple, different merchants), the imposition of sales tax for purchases where flash title was not taken would be unpredictable and highly confusing, perhaps to the point of appearing arbitrary. As a result, a commensurate drop in sales likely would result.

In contrast, by taking flash title, the unified storefront owner in effect becomes the relevant seller for purposes of determining sales liability. As a result, sales tax determination and collection for items sold through the unified storefront are simplified considerably and made predictable. Other state law and regulation issues also may benefit from the consistency of treatment realized by such unified storefront, flash title treatment.

The merchants 312 may include small businesses, large companies, organizations, individuals, or other entities selling an item. The fulfillment centers 332, which can be controlled but not necessarily owned by the intermediary, can fulfill orders from multiple merchants 312 having the same type or nature of items. The fulfillment centers 332 may be owned, operated or dedicated to one or more of the merchants 308. The fulfillment centers 332 may also be owned and operated independently of the merchants 312, the online sales channels 316, and/or the intermediary 344. The online sales channels 316 may include multiple web sites listing the items being sold. Alternatively, one or more of the online sales channels may be operated or controlled by the connection provider 344, as in the case of the unified storefront.

The merchants 312 may offer various items for sale with different properties, characteristics or fulfillment requirements. The connection provider 344 can identify and coordinate the fulfillment of an item for sale with a fulfillment center 312 that is tailored to a parameter to that item for sale. As described above, a fulfillment center may be tailored according to a set of one or more activities that are required for preparation of items prior to delivery to the buyer. Moreover, the connection provider 344 can identify a fulfillment center 322 that has particular environmental characteristics tailored to the items being sold, such as refrigeration for chocolate or flowers sold from merchant 302, in which a key parameter for the item sold is the temperature at which the inventory is stored. In another example, a key parameter of identifying the fulfillment center 324 can be geography—that is, the connection provider 344 can identify a fulfillment center 324 that, e.g., is geographically located near a certain agricultural facility for certain produce for a merchant 304. In general, one or more parameters may be associated with an item being sold and one or more parameters may be associated with a fulfillment center 326. An identified fulfillment center 326 may be tailored for one or a combination of parameters or characteristics for an item being sold.

As discussed in connection with FIG. 2, the merchant 236 can send information to and receive information from the connection provider 203. The sent information may include details and descriptions on the items for sales and any relevant parameters related to those items. After the merchant sends the information to the connection provider, the merchant may elect to have the connection provider coordinate all or part of the fulfillment obligations of the order. The connection provider 203 may process the information and select one or more fulfillment centers 283 based on one or more parameters from the item being sold. The information for the fulfillment centers, including parameter information, may reside on a database 201 in the connection provider's facilities.

In FIG. 3, the information sent from a merchant 312 to the connection provider 344 may include metadata or an extensible Markup Language (XML) object with one or more parameters of the items being sold. Instead of, or in addition to an XML object, the information sent from the merchant may include two or more objects, with one object containing information for the items being sold, and another object with information regarding one or more parameters. The term "object" may refer to information sources such as documents, reports, presentations, files and directories. Alternatively, the information sent from the merchant 312 to the connection provider 344 may be a single Product Data File delineating the items at a SKU (Stock Keeping Unit) level. The connection provider 344 may also provide a dedicated portal interface to merchants, in which a merchant can transmit information through the portal to the connection provider in a secure, pre-determined format.

The identification of an appropriate fulfillment center 332 typically is performed manually, for example, by a human operator associated with the seller or the connection provider. However, identification of a fulfillment could be performed, at least in part, by an automated process, for example, based on information received from the seller. But in a typical implementation, identification of an appropriate fulfillment center 332 for an item is manually performed by an operator associated with the connection provider system. The connection provider can determine the parameters for the items being sold and can manually identify an appropriate fulfillment center. In this implementation, a merchant need not send parameter information for the items being sold.

In another implementation, the merchant sends parameter information to the connection provider only once during initial setup of the merchant's account or relationship. If a merchant intends to sell only one type of item then the merchant does not need to resend parameter information along with information for their items for sale.

The connection provider 344 may provide different levels of service to different merchants. In one or more service levels, the connection provider 344 may provide total sales channel facilitation services to the seller 312 of the items. For instance, the connection provider (e.g., Accenture) 344 may provide a broad range of sales channel facilitation services, such as billing services, collection services, advertisements, and customer service. The customer service capabilities may include a tool to interface with a buyer, in which the customer service tool may present contact information and policies for the connection provider and online sales channel.

Other sales channel facilitation services may include inventory management, transportation management, order management, and listing tools. The listing tools can include providing descriptions, categories, keywords, titles, and scheduling for the items being sold. The listing tools can include pictures and descriptions of the items being sold. The connection provider can provide information about the seller, which can include a presentation of ratings of the seller from other previous buyers to provide post-transaction feedback. Potential buyers can examine the seller's feedback profile before bidding to rate the seller's items and trustworthiness.

The connection provider 344 can monitor a progress of the selling performance of the items. The connection provider 344 also can provide online auction capabilities and the ability to monitor auctions as they progress. The connection provider can help the merchant to formulate auction strategies based upon the merchant and/or the items being sold. For example, the connection provider 344 can suggest an auction duration period (e.g., 7 days), pricing (e.g., $10), and start and end times (e.g., 1 pm EST from one Friday to the following Friday) for the auction. The connection provider 344 also can provide various types of auctions, such as Dutch, Chinese, BIN, Large Lot, and Fixed Price.

After an item has been purchased, the connection provider 344 can inform a merchant 310 that a particular item has been purchased on a particular online sales channel 314 to be fulfilled by one or more fulfillment centers 332. The connection provider 344 can also provide data and statistics to the merchant 310 on the buyer and the sale of the item. The connection provider 344 may have a financial tool to report transactions to the merchant 310. The connection provider 344 may inform the merchant 310 (e.g., with an electronic mailing) of purchases or the number of bids on their items. The email to the merchant 310 may be automatically generated by a program and sent from the connection provider 344.

Figure 4:
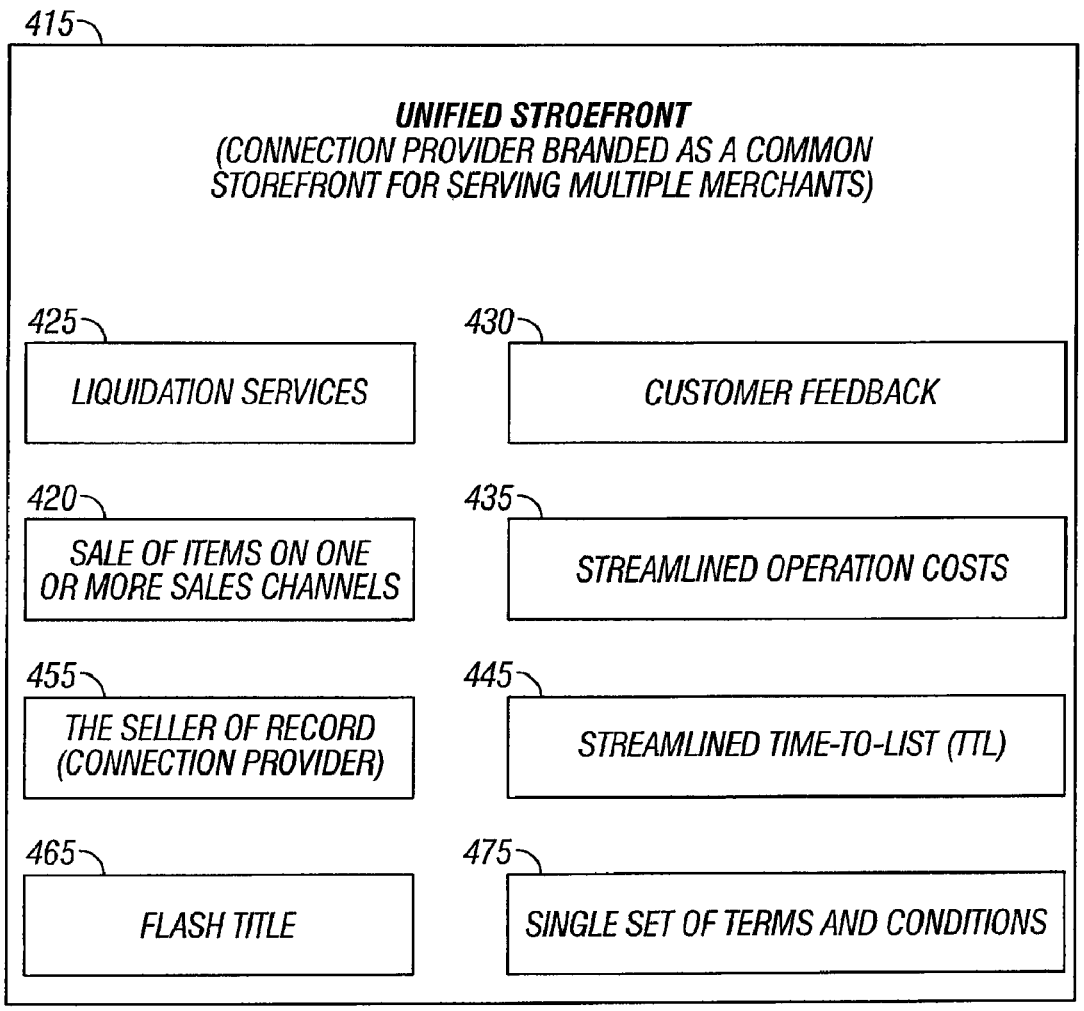
FIG. 4 is a block diagram showing exemplary aspects of the unified storefront.

FIG. 4 is a block diagram illustrating aspects of the connection provider as a unified storefront 415. The unified storefront can be used in cases of corporate asset recovery 420 in which businesses may want to sell used and/or obsolete assets (e.g., old office equipment, old parts for machines). The unified storefront 415 can provide liquidation services 425 to one or more merchants. In cases of corporate asset recovery and/or in cases where the merchant typically does not sell the type of items being sold online, the unified storefront can arrange the sale of the items and streamline the operation and setup costs 435 for the merchant. The Time to List (TTL) 445 one or more items online may also be reduced by using the unified storefront, rather than for merchants to develop their own sales channel. The unified storefront can serve as the seller of record 455 for the items—that is, the buyers can deal directly with the unified storefront, and not with the individual merchants.

As described above, the unified storefront can assume flash title 465 for some or all of the items at the point of sale. Between the connection provider and the various merchants, the connection provider can be in a better position to determine how to handle taxes in various jurisdictions. In another aspect, the unified storefront may require all of the merchants using the storefront to agree to a single, common set of terms and conditions 475 before providing items to list. The individual merchants can leverage the existing customer feedback 430 of the unified storefront to sell their items—thus, reducing and/or eliminating the need to market and promote their items for sale.

Figure 5:
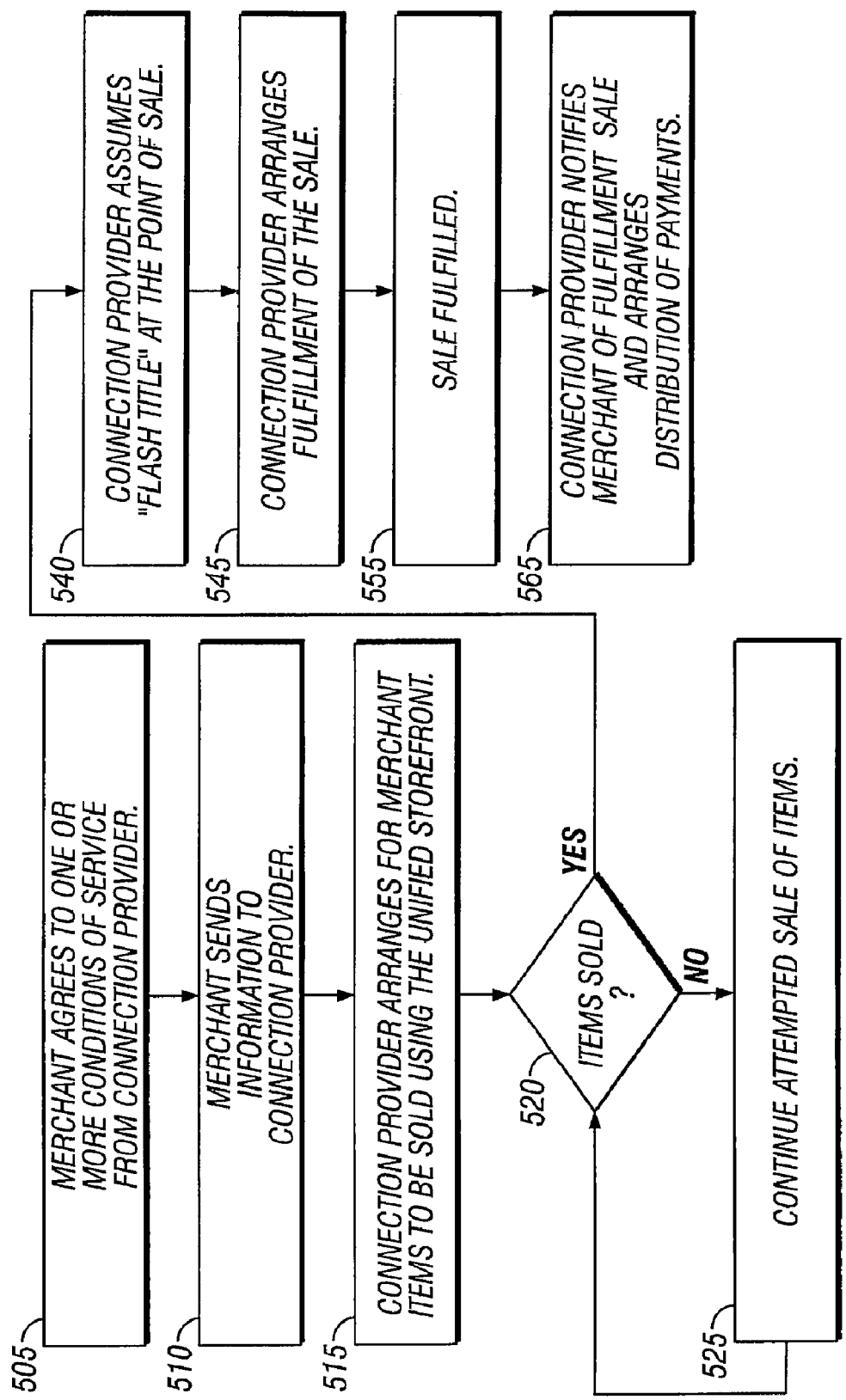
FIG. 5 is an illustrative flowchart of a process for selling items.

FIG. 5 shows a flowchart of a process for selling items on the unified storefront. The connection provider can have the merchant to agree to one or more terms and conditions of service before selling items on the unified storefront (block 505). The one or more terms and conditions of service may be the same for all of the merchants desiring to sell through the unified storefront. After the terms and conditions are agreed upon, the merchant can send information related for selling items to the connection provider (block 510). As noted above, the information provided in block 510 need not necessarily come from the merchant but rather can be provided in whole or in part by a third party, such as a refurbisher of used inventory.

The connection provider can arrange for the items to be sold on the one or more online sales channels 515 under the unified storefront (block 515). If items are sold (block 520), the connection provider can assume flash title of the item at the point of sale (block 540). The connection provider then can arrange fulfillment of the sale (block 545), and may use one or more fulfillment centers to complete fulfillment.

When the sale is fulfilled (block 555), the connection provider can notify the merchant of the fulfilled sale (block 565). In notifying the merchant, the connection provider can provide one or more statistics based on the sale and the performance of the sale. The performance of the sale can be tracked with the SKU of the item and with the internal SKU that the connection provider may use in tracking the same item among various merchants.

The connection provider also may arrange for the distribution of payments (block 565). In distributing the payments, the merchant and the connection provider may share a percentage of the proceeds based on the price of the sold item. For example, the merchant may receive a higher percentage of proceeds for items with larger selling prices (e.g., a 75% merchant share for items sold over $1000, but a 55% merchant share for items sold less than $250). The distribution of proceeds may include the payment of one or more taxes and fees. Some of these taxes and fees may include EBAY fees, third-party fees, refurbishment costs, processing costs, fulfillment costs, shipping costs, and sales tax.

The connection provider may have a transaction processor to vest flash title at a point of sale of an item (block 540). The transaction processor also may be able to perform any of the steps in blocks 540-565. The transaction processor may include one or more manual and/or automatic units that can be utilized during and/or after the point of sale. The transactional units may include software and documents (e.g., programs, scripts, spreadsheets, financial tools, e-commerce legal resources), computer equipment (e.g., database systems), and personnel working with the connection provider. For instance, the transaction processor can track the items for sale (e.g., by the SKUs), and provide one or more statistics to one or more merchants based on the items for sale (e.g., an average duration of the sale).

As used herein, the terms "electronic document" and "document" mean a set of electronic data, including both electronic data stored in a file and electronic data received over a network. An electronic document does not necessarily, but may, correspond to a file. A document may be stored in a portion of a file that holds other documents, in a single file dedicated to the document in question, or in a set of coordinated files. The term "object" may refer to information sources such as documents, reports, presentations, files and directories.

The disclosed software, techniques, and systems described herein may use software and structures available from the connection provider. Instead of or in addition to software and systems supplied by the connection provider, the disclosed software and systems may coexist or operate with software and systems provided by third parties.

Various implementations of the systems and techniques described here can be realized in digital electronic circuitry, integrated circuitry, specially designed ASICs (application specific integrated circuits), computer hardware, firmware, software, and/or combinations thereof. These various implementations can include one or more computer programs that are executable and/or interpretable on a programmable system including at least one programmable processor, which may be special or general purpose, coupled to receive data and instructions from, and to transmit data and instructions to, a storage system, at least one input device, and at least one output device.

The software (also known as programs, software tools or code) may include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on one or more computers each having a display device (e.g., a CRT (cathode ray tube) or LCD (liquid crystal display) monitor) for displaying information to the user and a keyboard and a pointing device (e.g., a mouse or a trackball) by which the user can provide input to the computer. For example, a buyer may view information from an online sales channel with a graphical user interface presented on a display device as shown in FIG. 2. Other kinds of devices can be used to provide for interaction with a user as well. For example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface, portal, or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), a wireless local area network ("WLAN"), a personal area network ("PAN"), a mobile communication network using a multiple access technology (e.g., a cellular phone network with Code Division Multiple Access, "CDMA"), and the Internet.

The computing system can include clients (FIG. 2) and servers. A client and server are generally remote from each other and typically interact through a communication network. The relationship of client and server arises by virtue of computer programs running on the respective computers and having a client-server relationship to each other.

Although only a few implementations have been described in detail above, other modifications are possible. Nevertheless, it will be understood that various modifications may be made without departing from the spirit and scope of the claims below. For example, the aspects listed in FIG. 4 may include other aspects for selling the items using the unified storefront. The logic flow depicted in FIG. 5 does not require the particular order shown, or sequential order, to achieve desirable results. Accordingly, other implementations are within the scope of the following claims.

What is claimed is:

1. A device comprising:
   an interface configured to receive, from different entities:
      product information describing items owned by the different entities, and
      a service parameter describing a service to be performed to place the items in suitable condition for anonymous sale; and
   a processor configured to:
      group the described items together for the anonymous sale,
      facilitate the anonymous sale of the grouped items, and
      facilitate fulfillment of the sold items according to the service parameter,
   wherein facilitating the anonymous sale of the grouped items further comprises:
      determining whether the grouped items have been anonymously sold,
      determining whether the anonymous sale has occurred in a jurisdiction where ownership of the grouped items is required for sale,
      assuming flash title of the grouped items based upon determining that the anonymous sale has occurred in a jurisdiction where ownership of the grouped items is required for sale and further based on determining that the grouped items have been anonymously sold, and
      selling the grouped items without assuming flash title based upon determining that the anonymous sale has occurred in a jurisdiction where ownership of the grouped items is not required for sale and further based on determining that the grouped items have been anonymously sold.

2. The device of claim 1, wherein:
   the service parameter describes a refurbishment service, a cleaning service, an alteration service, a modification service, an upgrading service, a restoration service, or an inventorying service to be performed on the item to place the item in suitable condition for the anonymous sale, and
   facilitating fulfillment of the sold items further comprises performing the refurbishment service, the cleaning service, the alteration service, the modification service, the upgrading service, the restoration service, or the inventorying service according to the service parameter prior to the anonymous sale.

3. The device of claim 1, wherein:
   the service parameter describes a storage or handling characteristic required by the item prior to the fulfillment to place the item in suitable condition for the anonymous sale, and
   facilitating the anonymous sale further comprises selecting a fulfillment center accommodating the storage or handling characteristic according to the service parameter.

4. The device of claim 1, wherein:
   flash title of the grouped items is assumed without taking possession of the grouped items; and
   the grouped items are sold without taking possessions of the grouped items.

5. The device of claim 1, wherein:
   the interface is further configured to receive, from the different entities, a level parameter describing a level of service to be provided,
   wherein facilitating the fulfillment of the sold items further comprises:
      fulfilling the anonymous sale using a tailored fulfillment center not controlled by either of the different entities, if the level parameter is a first value, and
      fulfilling the anonymous sale using the entities' own fulfillment center, if the level parameter is a second value.

6. A non-transitory computer readable medium encoded with a computer program product, the computer program product comprising instructions that, when executed, operate to cause a computer to perform operations comprising:
   receiving, from different entities:
      product information describing items owned by the different entities, and a service parameter describing a service to be performed to place the items in suitable condition for anonymous sale;

grouping the described items together for the anonymous sale;

facilitating the anonymous sale of the grouped items; and facilitating fulfillment of the sold items according to the service parameter, wherein facilitating the anonymous sale of the grouped items further comprises:

determining whether the grouped items have been anonymously sold, determining whether the anonymous sale has occurred in a jurisdiction where ownership of the grouped items is required for sale, assuming flash title of the grouped items based upon determining that the anonymous sale has occurred in a jurisdiction where ownership of the grouped items is required for sale and further based on determining that the grouped items have been anonymously sold, and selling the grouped items without assuming flash title based upon determining that the anonymous sale has occurred in a jurisdiction where ownership of the grouped items is not required for sale and further based on determining that the grouped items have been anonymously sold.

7. The computer readable medium of claim 6, wherein:

the service parameter describes a refurbishment service, a cleaning service, an alteration service, a modification service, an upgrading service, a restoration service, or an inventorying service to be performed on the item to place the item in suitable condition for the anonymous sale, and facilitating fulfillment of the sold items further comprises performing the refurbishment service, the cleaning service, the alteration service, the modification service, the upgrading service, the restoration service, or the inventorying service according to the service parameter prior to the anonymous sale.

8. The computer readable medium of claim 6, wherein:

the service parameter describes a storage or handling characteristic required by the item prior to the fulfillment to place the item in suitable condition for the anonymous sale, and facilitating the anonymous sale further comprises selecting a fulfillment center accommodating the storage or handling characteristic according to the service parameter.

9. The computer readable medium of claim 6, further comprising instructions that, when executed, operate to cause the computer to perform operations comprising:

receiving, from the different entities, a level parameter describing a level of service to be provided, wherein facilitating the fulfillment of the sold items further comprises:

fulfilling the anonymous sale using a tailored fulfillment center not controlled by either of the different entities, if the level parameter is a first value, and fulfilling the anonymous sale using the entities' own fulfillment center, if the level parameter is a second value.

10. A computer-implemented method comprising:

receiving, from different entities:

product information describing items owned by the different entities, and a service parameter describing a service to be performed to place the items in suitable condition for anonymous sale;

grouping the described items together for the anonymous sale;

facilitating the anonymous sale of the grouped items; and facilitating, by one or more computers, fulfillment of the sold items according to the service parameter, wherein facilitating the anonymous sale of the grouped items further comprises:

determining whether the grouped items have been anonymously sold;

determining whether the anonymous sale has occurred in a jurisdiction where ownership of the grouped items is required for sale;

assuming flash title of the grouped items based upon determining that the anonymous sale has occurred in a jurisdiction where ownership of the grouped items is required for sale and further based on determining that the grouped items have been anonymously sold; and selling the grouped items without assuming flash title based upon determining that the anonymous sale has occurred in a jurisdiction where ownership of the grouped items is not required for sale and further based on determining that the grouped items have been anonymously sold.

11. The method of claim 10, wherein:

the service parameter describes a refurbishment service, a cleaning service, an alteration service, a modification service, an upgrading service, a restoration service, or an inventorying service to be performed on the item to place the item in suitable condition for the anonymous sale, and facilitating fulfillment of the sold items further comprises performing the refurbishment service, the cleaning service, the alteration service, the modification service, the upgrading service, the restoration service, or the inventorying service according to the service parameter prior to the anonymous sale.

12. The method of claim 10, wherein:

the service parameter describes a storage or handling characteristic required by the item prior to the fulfillment to place the item in suitable condition for the anonymous sale, and facilitating the anonymous sale further comprises selecting a fulfillment center accommodating the storage or handling characteristic according to the service parameter.

13. The method of claim 10, wherein:

the product information describes the items without uniquely identifying each item;

the service parameter describes a fragmented inventory service; and grouping the described items together for the anonymous sale further comprises assigning a unique identifiers to each item.

14. The method of claim 10, wherein:

flash title of the grouped items is assumed without taking possession of the grouped items; and the grouped items are sold without taking possessions of the grouped items.

15. The method of claim 10, wherein facilitating the anonymous sale of the grouped items further comprises selling the grouped items without identifying either of the different entities to a purchaser.

16. The method of claim 10, wherein facilitating the anonymous sale of the grouped items further comprises selling the grouped items without identifying that the grouped items are owned by different entities.

17. The method of claim 10, further comprising:
receiving, from the different entities, a level parameter describing a level of service to be provided;
wherein facilitating the fulfillment of the sold items further comprises:

fulfilling the anonymous sale using a tailored fulfillment center not controlled by either of the different entities, if the level parameter is a first value, and fulfilling the anonymous sale using the entities' own fulfillment center, if the level parameter is a second value.

\* \* \* \* \*